United States Patent
Reitz

(10) Patent No.: US 9,109,395 B2
(45) Date of Patent: Aug. 18, 2015

(54) CORNER LADDER STABILIZER APPARATUS

(71) Applicant: Raymond Reitz, McKeesport, PA (US)

(72) Inventor: Raymond Reitz, McKeesport, PA (US)

( * ) Notice: Subject to any disclaimer, the term of this patent is extended or adjusted under 35 U.S.C. 154(b) by 139 days.

(21) Appl. No.: 13/911,487

(22) Filed: Jun. 6, 2013

(65) Prior Publication Data

US 2013/0327907 A1 Dec. 12, 2013

Related U.S. Application Data

(60) Provisional application No. 61/656,199, filed on Jun. 6, 2012.

(51) Int. Cl.
 E06C 7/14 (2006.01)
 E06C 7/18 (2006.01)
 E06C 7/48 (2006.01)

(52) U.S. Cl.
 CPC ................. *E06C 7/188* (2013.01); *E06C 7/482* (2013.01)

(58) Field of Classification Search
 CPC ............... F16M 13/025; A47B 96/022; A47B 2097/008; F16B 9/023; E06C 7/188; E06C 7/14; E06C 7/48; E06C 7/482
 USPC .................... 248/210, 214, 220.1, 205.1, 500, 248/292.12, 291.1; 182/82, 90, 220, 230, 182/107, 214
 See application file for complete search history.

(56) References Cited

U.S. PATENT DOCUMENTS

| | | | |
|---|---|---|---|
| 3,715,012 A * | 2/1973 | Perry | 182/107 |
| 5,010,979 A | 4/1991 | Shreve, III | |
| 5,121,814 A | 6/1992 | Southern | |
| 5,323,875 A | 6/1994 | Kennett | |
| D348,938 S | 7/1994 | Kennett | |
| D366,319 S | 1/1996 | Sheftel | |
| 5,664,643 A * | 9/1997 | Taylor, Jr. | 182/214 |
| 5,850,894 A * | 12/1998 | Busenhart | 182/214 |
| D406,652 S | 3/1999 | Marchand | |
| D408,556 S | 4/1999 | Ruiz | |
| 6,015,123 A * | 1/2000 | Perez et al. | 248/220.1 |
| 6,123,305 A * | 9/2000 | Lukasavitz | 248/292.12 |
| 6,250,424 B1 * | 6/2001 | Laug | 182/107 |
| 6,364,261 B1 * | 4/2002 | Vass, Jr. | 248/220.1 |
| 6,851,518 B1 | 2/2005 | Walker | |

\* cited by examiner

*Primary Examiner* — Anita M King
(74) *Attorney, Agent, or Firm* — Buckingham, Doolittle & Burroughs, LLC

(57) ABSTRACT

A corner ladder stabilizing apparatus for stabilizing a ladder against a corner of a building or structure. The corner ladder stabilizing apparatus comprises a rung engaging member for attaching to the ladder and either an outside corner engaging element or an inside corner engaging element, depending on the corner to be laddered, is secured to the rung engaging member.

3 Claims, 4 Drawing Sheets

US 9,109,395 B2

CORNER LADDER STABILIZER APPARATUS

CROSS-REFERENCE

This application claims priority from Provisional Patent Application Ser. No. 61/656,199 filed Jun. 6, 2012.

FIELD OF THE INVENTION

This invention pertains generally to a corner ladder stabilizer apparatus for use in stabilizing a ladder placed against a corner, and more particularly to a corner ladder stabilizer apparatus that can stabilize a ladder placed against either an inside corner or an outside corner of a structure.

BACKGROUND

When using a ladder to work on or around a house or other structure, it is difficult to work on the corner areas. Once the worker gets to the end of a wall, the worker must move the ladder to the edge of the wall and finish the work on that side of the wall. Then the worker must climb down and move the ladder around the corner to the adjacent wall. The worker then must climb back up the ladder to finish the project. As people generally want to complete a task with the least amount of effort, there is a tendency to attempt to complete the work on the corner without moving the ladder twice. This leads to the worker over extending his reach to get around the corner leaving him off balance and in danger of falling.

Consequently, there exists a need for a device designed to allow a worker to work on both sides of a corner without the need to move the ladder twice. The present invention discloses an apparatus that allows a worker to safely prop a ladder up against the corner of a house or building and access both sides simultaneously. The apparatus is adaptable to both straight and extension ladders. Additionally, the device is adaptable so that the ladder may be used on both inside and outside corners.

SUMMARY

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a stabilizing apparatus for a ladder placed against a corner of a building or other structure. The stabilizing apparatus comprises a ladder securing element for attaching to a ladder rung. The ladder securing element is typically a U-shaped member that fits around the ladder rung and is secured in place with a fastener. The stabilizing apparatus further comprises a corner engaging element attached to the ladder securing element allowing the ladder to be placed against the corner of the building in a stable manner.

Furthermore, in a preferred embodiment of the invention of the stabilizing apparatus, the corner engaging element comprises an outside corner engaging element and an inside corner engaging element. The outside corner engaging element comprises an outside angle frame that forms an approximately 90 degree angle for stabilizing a ladder against an outside corner of a building. The inside corner engaging element comprises an inside angle frame that forms an approximately 270 degree angle for stabilizing the ladder against an inside corner of a building. Both the outside corner element and the inside corner element are removably securable to the ladder engaging element depending on the type of corner that the ladder will be placed against.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
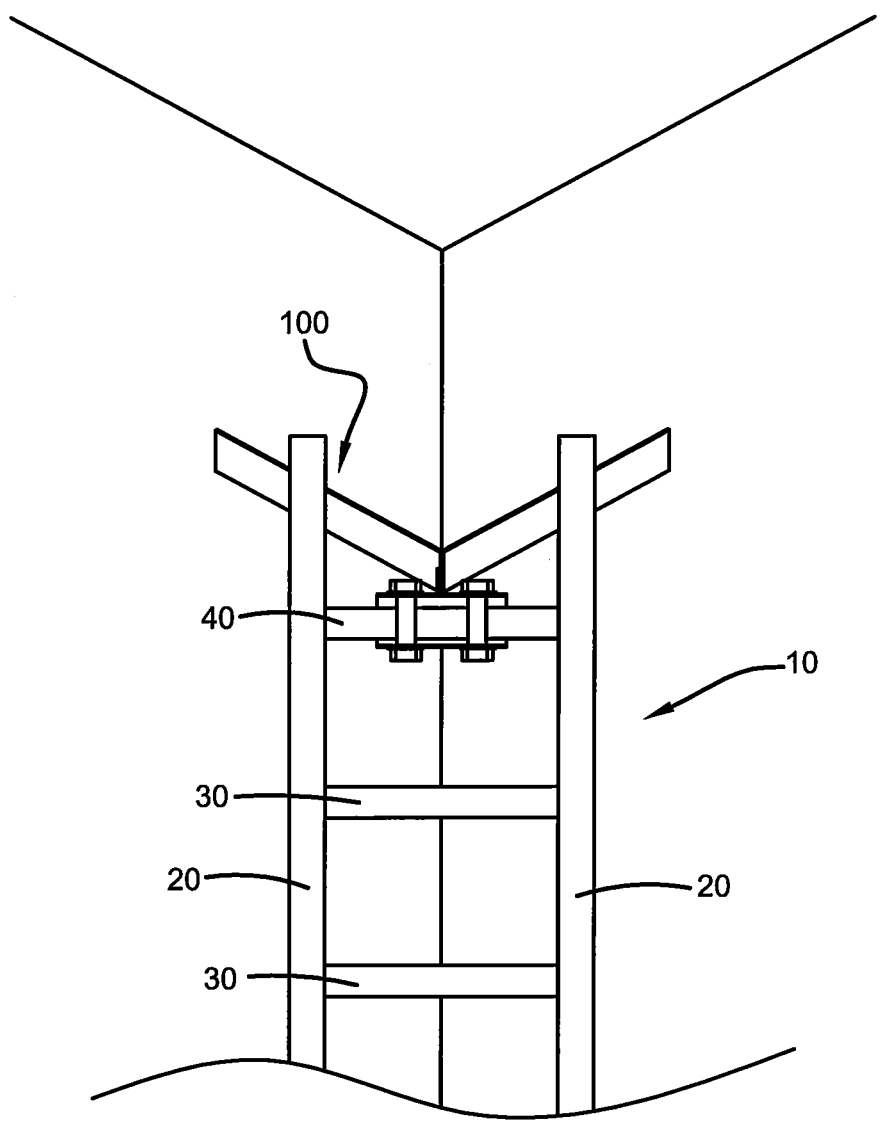
FIG. 1 illustrates a perspective view of a corner ladder stabilizer apparatus in use on an outside corner in accordance with the disclosed architecture.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter. The invention relates generally to a corner ladder stabilizer apparatus for use with a ladder placed adjacent to a corner of a structure.

Referring initially to the drawings, FIG. 1 illustrates a corner ladder stabilizer apparatus 100 for use with a ladder 10 having a pair of rails 20 and a plurality of rungs 30. Typically the corner ladder stabilizer apparatus 100 is attached to a top rung 40 of the plurality of rungs 30 of the ladder 10, although it could be placed on any of the plurality of rungs 30. For example, if the ladder 10 is taller than the structure being laddered, one of the plurality of rungs 30 below the top rung 40 may be selected that will adequately stabilize the ladder 10 against a corner of a structure. The corner ladder stabilizer apparatus 100 may be used with any straight or extension ladder. When the ladder 10 with the corner ladder stabilizer apparatus 100 is in place on the corner of the structure, both walls adjacent to the corner of the structure are then accessible from the ladder 10.

Figure 2:
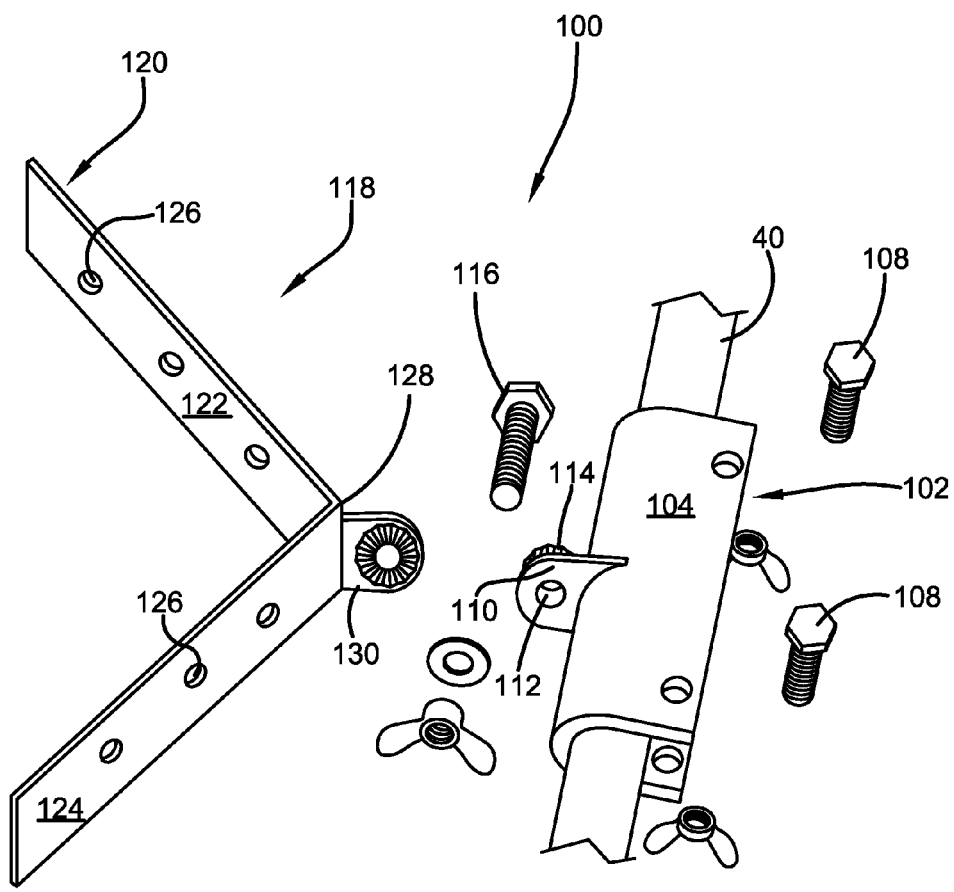
FIG. 2 illustrates an exploded view of the corner ladder stabilizer apparatus for use on an outside corner in accordance with the disclosed architecture.
Figure 3:
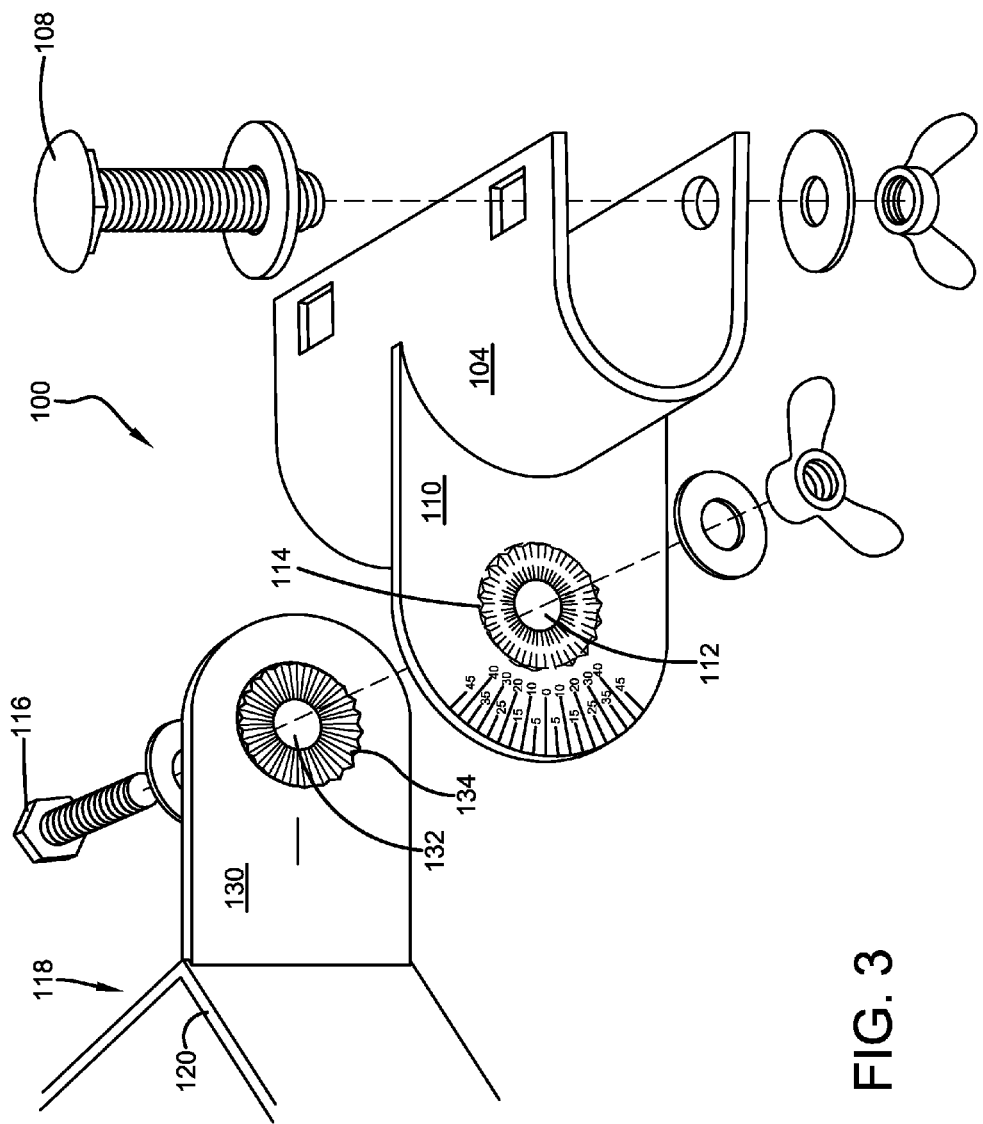
FIG. 3 illustrates a close-up exploded view of a ladder engaging element of the corner ladder stabilizer apparatus in accordance with the disclosed architecture.

As illustrated in FIGS. 2 and 3, the corner ladder stabilizer apparatus 100 comprises a ladder engaging element 102 and an outside corner engaging element 118. The ladder engaging element 102 comprises a rung engaging member 104, a fastening member 108, and a connecting member 110. The rung engaging member 104 is typically an approximately ¼ inch thick piece of metal bent into a U-shape bracket comprising a pair of substantially parallel sides 106. The rung engaging member 104 is approximately between six and eight inches in length. Generally, the rung engaging member 104 slides over and substantially encapsulates the top rung 40 of the ladder 10. Alternatively, as discussed supra, the rung engaging member 102 may be used on any of the plurality of rungs 30.

Once the rung engaging member 104 is in place around the top rung 40, the fastening member 108 is used to secure the rung engaging member 104 in place. The pair of substantially parallel sides 106 of the U-shaped bracket may each have a pair of holes substantially in-line with each other. The fastening member 108 is typically a pair of 4 inch by ½ inch bolts that run through the pair of holes and are locked in place with a pair of lock washers and a pair of wing nuts. However, any other fasteners known in the art may be used as well to secure the rung engaging member 104 in place.

The connecting member 110 is typically a curved piece of metal welded or otherwise permanently attached to an outside curve of the U-shaped bracket. The connecting member 110 comprises a through hole 112, a first toothed connector 114, and a connecting fastener 116. The first toothed connector 114 is typically a washer with teeth that is welded or otherwise permanently attached to the connecting member 110 adjacent to the through hole 112. The connecting fastener 116 is typically a threaded bolt which penetrates the through hole 112 and the first toothed connector 114 to attached to the outside corner engaging element 118 as discussed infra. The threaded bolt may be secured with a washer and a wing nut or any other similar securing hardware as is known in the art.

The outside corner engaging element 118 comprises an outside angle frame 120 and an outside engaging member 130. The outside engaging member 130 is typically welded or otherwise permanently attached to the outside angle frame 120. The outside engaging member 130 is typically similar in construction to the connecting member 110, comprising a through hole 132 and a second toothed connector 134. To connect the outside engaging member 130 to the connecting member 110, a user aligns the washer with teeth on the connecting member 110 with a welded washer with teeth of the second toothed connecter 134. Then connecting fastener 116 is threaded through both through holes 112 and 132, and is secured with the washer and wing nut.

The outside angle frame 120 comprises a first leg 122 and a second leg 124 joined at a center section 128 forming an approximately 90 degree angle. As such, the approximately 90 degree angle permits the first leg 122 and the second leg 124 to contact adjacent wall surfaces around an outside corner of a structure, thereby stabilizing the ladder 10 against the outside corner. The first leg 122 and the second leg 124 are typically flat ¼ inch thick metal bar stock each approximately between one and two inches in height and each approximately between twelve and twenty four inches in length. However, both the first leg 122 and the second leg 124 may have larger dimensions to stabilize taller ladders.

Both the first leg 122 and the second leg 124 may comprise a plurality of attachment holes 126 penetrating the bar stock for allowing screws or nails to provide additional stability against the corner. Further, a pair of padded rubber, plastic, cloth, or the like sleeves (not shown) may be slid over the first leg 122 and the second leg 124 for added friction against the corner. The outside engaging member 130 is attached to the center section 128 on a side opposite of the approximately 90 degree angle.

Figure 4:
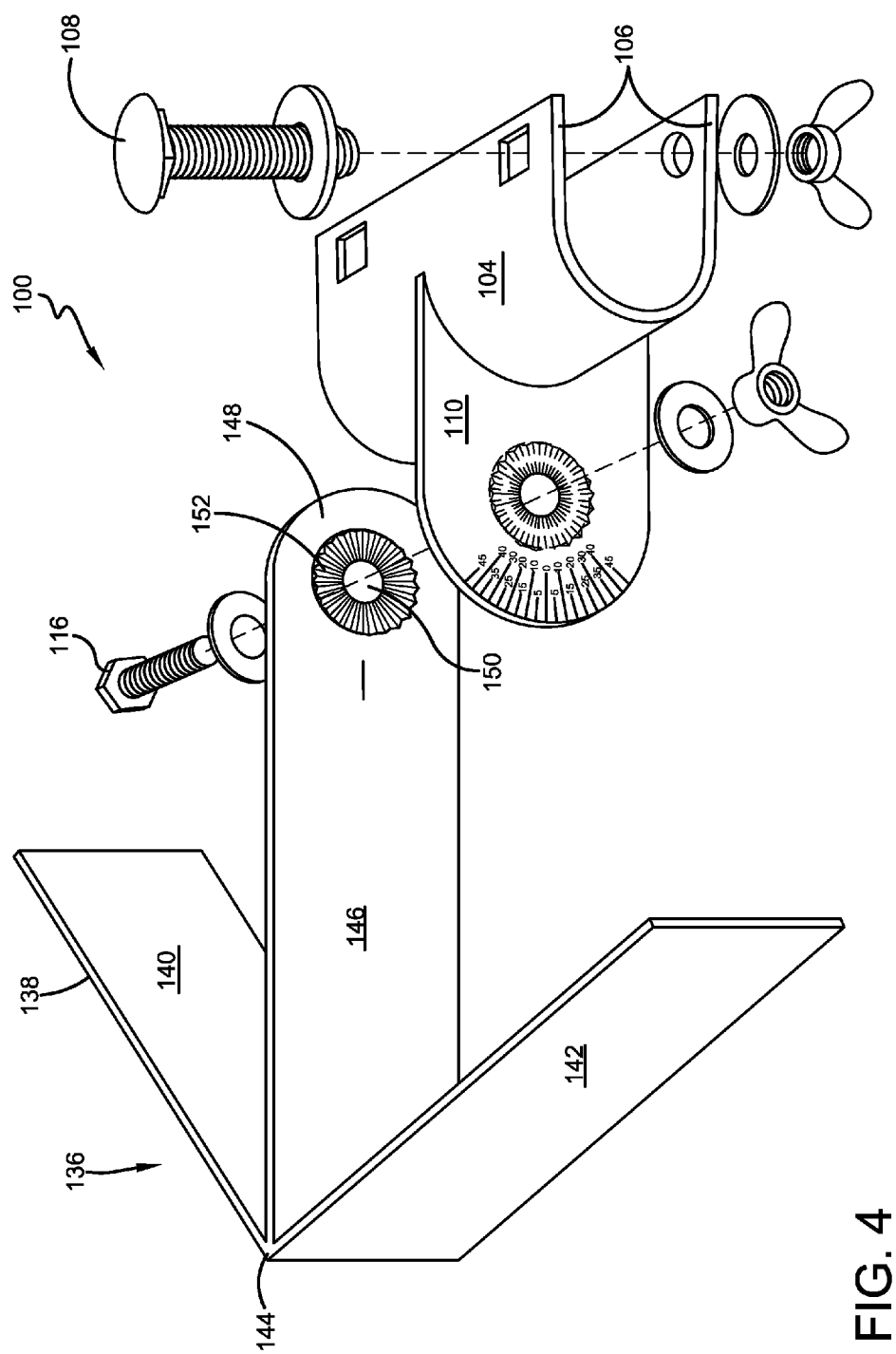
FIG. 4 illustrates an exploded view of the corner ladder stabilizer apparatus for use on an inside corner in accordance with the disclosed architecture.

As illustrated in FIG. 4, the corner ladder stabilizer apparatus 100 may further comprise an inside corner engaging element 136 for stabilizing the ladder 10 against an inside corner. The inside corner engaging element comprises an inside angle frame 138 and an inside engaging member 148. The inside engaging member 148 is typically welded or permanently integrated into the inside angle frame 138. The inside engaging member 148 is typically similar in construction to the connecting member 110, comprising a through hole 150 and a third toothed connector 152. To connect the inside engaging member 148 to the connecting member 110, a user aligns the washer with teeth on the connecting member 110 with a welded washer with teeth of the third toothed connecter 152. Then connecting fastener 116 is threaded through both through holes 112 and 150, and is secured with the washer and wing nut.

The inside angle frame 138 comprises a first inside leg 140 and a second inside leg 142 joined at an inside center section 144 forming an approximately 270 degree angle. As such, the approximately 270 degree angle permits the first inside leg 140 and the second inside leg 142 to contact adjacent wall surfaces around an inside corner of a structure, thereby stabilizing the ladder 10 against the inside corner. The first inside leg 140 and the second inside leg 142 are typically flat ¼ inch thick metal bar stock each approximately between one and two inches in height and each approximately between twelve and twenty four inches in length, similar to the first leg 122 and the second leg 124 of the outside angle frame 120.

The inside angle frame 138 further comprises a third inside leg 146. The third inside leg 146 is of similar construction as the first inside leg 140 and the second inside leg 142 as discussed supra. However, the third inside leg 146 will be at least three inches longer. The third inside leg 146 is welded or otherwise permanently attached to the inside center section 144 so that the third inside leg 146 extends substantially opposite from the approximately 270 degree angle. The inside engaging member 148 is typically located on the third inside leg 146 on an end that does not abut the center inside section 144.

To use the corner ladder stabilizer device 100, the user attaches the ladder engaging element 102 to typically the top rung 40 of the ladder 10. The user then selects either the outside corner engaging element 118 or the inside corner engaging element 136 depending on the type of corner to be laddered. Then either the outside corner engaging element 118 or the inside corner engaging element 136 is bolted to the ladder engaging element 102 as described supra.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A corner ladder stabilizer apparatus for use with a ladder having a pair of rails and a plurality of rungs, the corner ladder stabilizer comprising:

a ladder engaging element comprising a rung engaging member, a plurality of fastening members for securing the rung engaging member to one of the plurality of rungs, and a connecting member comprising a through hole and a first toothed connector attached to the rung engaging member; and an inside corner engaging element comprising an inside angle frame and an inside engaging member attached to the inside angle frame for securing the inside corner engaging element to the connecting member of the ladder engaging element; and wherein the inside angle frame comprises a first inside leg and a second inside leg joined at an inside center section forming an approximately 270 degree angle, and a third inside leg extending from the inside center section opposite from the approximately 270 degree angle; and wherein the third inside leg comprises a through hole and a third toothed connector for engaging the first toothed connector of the connecting member.

2. The corner ladder stabilizer apparatus of claim 1, wherein the rung engaging member is a U-shaped bracket.

3. The corner ladder stabilizer apparatus of claim 1, wherein the third inside leg is longer than the first inside leg and the second inside leg.

* * * * *